United States Patent
Schweitzer et al.

(10) Patent No.: US 6,198,108 B1
(45) Date of Patent: Mar. 6, 2001

(54) DOSIMETER DEVICE AND METHOD OF PRODUCING SAME

(75) Inventors: David Schweitzer, West Hartford; Matthew Bantly, Granby, both of CT (US); Robert Wheeler, Lemont, IL (US)

(73) Assignee: Landauer, Inc., Glenwood, IL (US)

( * ) Notice: Subject to any disclaimer, the term of this patent is extended or adjusted under 35 U.S.C. 154(b) by 0 days.

(21) Appl. No.: 09/061,539

(22) Filed: Apr. 16, 1998

Related U.S. Application Data

(60) Provisional application No. 60/051,171, filed on Jun. 27, 1997.

(51) Int. Cl.$^7$ .................................................. G01T 1/02
(52) U.S. Cl. .............................. 250/472.1; 250/474.1; 250/475.2; 250/482.1
(58) Field of Search ....................... 250/472.1, 474.1, 250/482.1, 484.5, 337, 475.2

(56) References Cited

U.S. PATENT DOCUMENTS

| | | | | |
|---|---|---|---|---|
| 2,161,644 | * | 6/1939 | Van Der Grinten | 250/83 |
| 2,753,460 | | 7/1956 | Reed et al. | |
| 2,902,602 | * | 9/1959 | Chassende-Baroz | 250/65 |
| 2,938,121 | * | 5/1960 | Fitzgerald et al. | 250/83.1 |
| 3,604,931 | * | 9/1971 | Kastner et al. | 250/83.1 |
| 3,652,854 | | 3/1972 | Wheeler. | |
| 4,056,729 | * | 11/1977 | Collica et al. | 250/472 |
| 4,130,760 | * | 12/1978 | Fanselow et al. | 250/474 |
| 4,847,503 | * | 7/1989 | Tetley et al. | 250/435 |
| 4,954,716 | | 9/1990 | Wheeler. | |
| 4,999,503 | * | 3/1991 | Andru | 250/472.1 |
| 5,084,623 | * | 1/1992 | Lewis et al. | 250/474.1 |
| 5,099,132 | * | 3/1992 | Ueno et al. | 250/474.1 |
| 5,179,281 | | 1/1993 | Tawil et al. | |
| 5,262,649 | * | 11/1993 | Antonuk et al. | 250/370.09 |

OTHER PUBLICATIONS

PCT Search Report of corresponding PCT application No. PCT/US98/12626.

* cited by examiner

*Primary Examiner*—Constantine Hannaher
(74) *Attorney, Agent, or Firm*—Trexler, Bushnell, Giangiorgi, Blackstone & Marr, Ltd.

(57) ABSTRACT

A dosimeter device that is fabricated from a flat member separated into panels along fold lines. In an illustrated embodiment, a first panel has two attenuators thereon, a first attenuator formed of a first material and a second attenuator formed of a second material. The first panel also has a window or opening formed thereon. A second panel also has two attenuators thereon, a third attenuator formed of the same material as the first attenuator on the first panel and a fourth attenuator formed of the same material as the second attenuator on the first panel. The second panel is separated from the first panel by a fold line, and the second panel also has a window or opening formed thereon. A third panel is separated from the second panel by a second fold line, and has a radiation sensitive member thereon. When the flat member is folded along the fold lines, the third panel becomes sandwiched between the first and second panels, and the first and third attenuators oppose each other with the radiation sensitive member sandwiched therebetween. Likewise, the second and fourth attenuators oppose each other with the radiation sensitive member sandwiched therebetween. Additionally, the windows on the first and second panels oppose each other with the radiation member sandwiched therebetween. Preferably, indicia is provided on at least the third panel to provide certain information.

28 Claims, 7 Drawing Sheets

DOSIMETER DEVICE AND METHOD OF PRODUCING SAME

RELATED APPLICATIONS

This application claims the benefit of U.S. Provisional Application No. 60/051,171, filed on Jun. 27, 1997.

BACKGROUND

The present invention relates generally to novel construction for a dosimeter badge, and to methods of producing said dosimeter badge construction, and relates more specifically to a novel dosimeter badge formed on flat stock and to a novel method of producing dosimeter badges using flat stock.

In view of the fact that exposure to an excessive level of radiation can be extremely harmful, many employers whose employees must work in a radioactive environment, such as nuclear power plant operators, utilize a program whereby the employees are required to wear one or more dosimeter badges while at work. After a period of time, the dosimeter badges are collected and analyzed to determine the extent of radiation exposure to which each employee has been subject. Thereafter, corrective measures can be taken to diminish the risk of any particular employee of overexposure to radiation.

Presently, there are four methods of dosimetry which are generally used to monitor the extent of exposure to radiation. The first method is the use of radiological monitoring film. Radiological film has been used to monitor radioactive exposure in the workplace for over seventy years. In fact, this method remains the most widely used in the world. Essentially, when radiological film is used, each worker is required to wear one or more dosimeter badges in each of which sits radiological film. After a period of time, the badges are collected and analyzed to determine the amount of radioactive exposure.

As radiation passes through a dosimeter badge, filters in the badge filter the radiation in order to produce a multiple-density image on the radiological film. This multiple-density image is analyzed and provides, essentially, a quantitative and visual record of both the amount of exposure, and the conditions that existed during the exposure. For example, the greater the density or film darkening on the radiological film, the greater the dose of radiation to which the radiological film was exposed. Additionally, the angularization of the image formed indicates direction of exposure or movement or lack thereof, during exposure. For example, a sharp image formed on the radiological film indicates that the exposure to radiation was static, such as would be the case if the badge were left in an x-ray examination room. In contrast, a blurred image formed on the radiological film indicates that the badge was moving during exposure. Other characteristics of the image formed on the radiological film may indicate that the badge was incorrectly worn, or that the film had been contaminated.

The image formed on the radiological film not only provides a visual record of the exposure, but because of the nature of radiological film, provides a permanent record of the exposure, that can be re-evaluated should the need arise. Unfortunately, radiological film cannot be reused, however, it is usually more desirable to store the film to maintain a permanent record of the exposure. Typically, each radiological film includes embossed characters or coded perforations thereon to allow each film to be identified in terms of who wore the badge in which that particular film was contained, and during what specific period of time.

While radiological film is relatively inexpensive due to economies of scale, radiological film presents some disadvantages. For example, elaborate packaging must be used to protect the emulsion on the film from light, humidity and handling damage. This is because light, heat and pressure may induce the film to darken, and this film darkening can be mistaken for exposure to radiation. Furthermore, radiological film can be used only to monitor radiation exposure within a specific, limited range. Additionally, developing the film presents a laboratory inconvenience. Unfortunately, automated processors typically found in hospitals cannot be used to develop the film because these processors are designed for much larger film and rapid processing. Developing the film requires close monitoring of chemical strength and temperature, as well as developing time. For these reasons, developing the film and analyzing the image thereon is generally left to large commercial monitoring services which can employ advanced quality control methods, and which can benefit from economies of scale.

A common badge in which radiological film is inserted is a badge which includes a plastic film-holding member having a slot thereon for receiving the film. Adjacent to and surrounding the slot are two U-shaped, usually metal, filters, wherein each U-shaped filter is formed of a different metal having a different atomic number. Additionally, the plastic film-holding member typically has an aperture therein that leads to the film-receiving slot, and therefore to the film. Each of the U-shaped filters and the apertures are located adjacent to a different portion of the film when the film is inserted in the slot. This overall construction of the dosimeter badge provides essentially four different filters positioned adjacent the film for filtering radiation that passes through the badge. Specifically, a first filter of metal, a second filter of another type of metal, a third filter of plastic (provided by the plastic film-holding member itself), and a fourth "filter", a non-filter, formed by the aperture adjacent the slot. As a result of the four filters, a multiple-density, or "shaped", image is formed on the film when radiation passes through the badge. Subsequently, this multiple-density image can be analyzed to determine the exposure to radiation.

Unfortunately, the above-described badge used in connection with radiological film is bulky and can only be used in connection with film. The badge cannot be used in connection with the other methods of dosimetry which will be described. Additionally, the construction of the badge is such that the film is inserted into the plastic film-holding member as a secondary operation, normally by hand. Furthermore, the film must be removed from the badge in order to analyze the image formed thereon, and this requires yet another operation.

The remaining methods of dosimetry utilize special crystals doped with impurities which trap energy deposited by radiation. When these special crystals are used to monitor exposure to radiation in the workplace, each worker is required to wear one or more dosimeter badges in each of which sits a plurality, such as four, of the crystals. As radiation passes through a badge, filters associated with certain of the crystals, filter the radiation as the radiation deposits energy in each of the four crystals, one crystal remaining unfiltered. After some period of time, the dosimeter badges are collected, and the crystals are analyzed to determine the extent of exposure to radiation.

Within one method of dosimetry, the crystals are analyzed by heating them to high temperatures, such as from 250° to 300° degrees Celsius, causing the energy trapped in the crystals to be released as luminescence. The amount of luminescence is proportional to the extent of radiation exposure. Therefore, analyzing the amount of luminescence provides that the amount of exposure to radiation can be determined. This method of dosimetry has come to be called thermoluminescence dosimetry (TLD).

Within another method of dosimetry, optical energy is used instead of thermal energy, and specifically laser energy is used to produce the luminescence in the crystals after exposure to radiation. This method of dosimetry has come to be called optically stimulated luminescence (OSL).

Within yet another method of dosimetry, the crystals are cooled with liquid nitrogen, and then stimulated with light. Then, the crystals are allowed to warm to room temperature. During warming, the crystals luminescence in proportion to the amount of energy deposited during exposure to radiation. Therefore, analyzing the luminescence can allow one to determine the extent of exposure to radiation. This method of dosimetry has come to be called cooled optically stimulated luminescence (COSL).

The nature of the special crystals used within the second, third and fourth above-described methods of dosimetry provide certain advantages over radiological film. For example, the measurement range of the crystals greatly exceeds that of film, and the crystals better simulate human tissue than does film. Additionally, the crystals are less susceptible to physical damage. Furthermore, the crystals avoid the chemical developing process required by radiological film, and can be analyzed using a small, highly automated reader.

Unfortunately, the nature of the crystals also offer some disadvantages in relation to film. For example, unlike film, the crystals cannot provide any indication of the exposure conditions. Also, indicia generally cannot be provided on the crystal itself to provide an indication of who wore the badge containing the crystal and during what period of time. Instead, each crystal must be identified by its position in a card or plate that has a unique identification number thereon.

Furthermore, TLD specifically offers additional disadvantages. While the heating of the crystals provide that they can be reused because the dosimetry traps therein are cleared, the clearing of the dosimetry traps provides that the crystals cannot be re-evaluated. Therefore, TLD does not offer the same permanent record of the radiation exposure as does radiological film or the crystals when analyzed using either the OSL or COSL dosimetry methods.

A common dosimeter badge in which the special crystals are inserted is a badge which includes a plastic member that has a slot for receiving a plastic card carrying the four crystals. Once the card is inserted in the slot, a different filter is aligned with the crystals, one crystal remaining unfiltered. A first filter is formed by two metal discs, each comprised of a specific type of metal, and each located on opposing sides of one crystal. A second filter resembles the first, but the discs are formed of a different type of metal, and are aligned with another crystal. A third filter is formed by the plastic member itself, and a fourth "filter", essentially a non-filter, is formed by opposing apertures in the plastic member. After exposure to radiation, the plastic card can be removed from the plastic member, and the crystals can be analyzed using one of the above-described three methods, namely TLD, OSL or COSL. Should TLD be utilized, the crystals will need to be removed from the plastic card before being subjected to the extreme heat required to perform the analysis.

Unfortunately, the above-described dosimeter badge which is used in connection with the crystals and the TLD, OSL and COSL dosimeter methods cannot also be used with radiological film. Additionally, the badge is bulky, and requires the secondary operation of inserting the plastic card in the plastic member, and the subsequent operation of removing the plastic card to analyze the crystals. Additionally, should the TLD dosimetry method be utilized, the crystals must be removed from the plastic card before heating, and the crystals must subsequently be re-associated with some external indicia to identify who wore the corresponding badge and during what time period. Obviously, this presents a chance for error.

While the present invention is not specifically directed to solve all the problems associated with each of the four existing dosimetry methods, the present invention is directed to solve most of the problems encountered heretofore with respect to the badges which have been used in connection therewith. The present invention is also specifically directed to a novel method of producing dosimeter badges.

OBJECTS AND SUMMARY OF THE DISCLOSURE

A general object of the present invention is to provide a dosimeter device, or badge, that can be used in connection with any of the commonly used methods of dosimetry.

Another object of the present invention is to provide a dosimeter device, or badge, that is streamlined, being relatively small, light and thin.

Still another object of the present invention is to provide a dosimeter device, or badge, that is inexpensive to produce within a relatively simple, continuous method.

Yet still another object of the present invention is to provide a dosimeter device, or badge, that is an integrated device made from relatively flat stock.

A further object of the present invention is to provide a dosimeter device, or badge, where a radiation sensitive member is essentially integral with identifying indicia.

Still a further object of the present invention is to provide a dosimeter device, or badge, which can be quickly produced several at a time.

A still further object of the present invention is to provide a dosimeter device, or badge, which can be produced using, essentially, a printing method.

Still yet a further object of the present invention is to provide an essentially continuous method of producing a dosimeter device, or badge.

Yet a still further object of the present invention is to provide a method of producing a dosimeter device, or badge, using a flat stock, for example, of paper.

A still yet further object of the present invention is to provide a method of producing dosimeter devices, or badges, where several can be produced at the same time, in an essentially continuous method.

Briefly, and in accordance with the above, the present invention envisions a dosimeter device including a flat member bendable along at least one line to divide the flat member into at least two panels, and a radiation sensitive member on at least one of the panels and sandwiched between the panels when the flat member is folded along the line.

A preferred embodiment envisioned by the present invention is a dosimeter device that includes a flat member separated into three panels along two fold lines. A first panel includes a radiation sensitive member. A second panel has at least two attenuators thereon, a first attenuator formed of a first material and a second attenuator formed of a second material. The second panel also has a window formed thereon. A third panel also has at least two additional attenuators thereon, a third attenuator formed of the same material as the first attenuator on the second panel and a fourth attenuator formed of the same material as the second attenuator on the second panel. The panels are separated by fold lines, and the third panel also has a window formed thereon. When the flat member is folded along the first and second fold lines, the first panel becomes sandwiched between the third and second panels, and the first and third attenuators are aligned and oppose each other with the radiation sensitive member sandwiched therebetween. Likewise, the second and fourth attenuators are aligned and oppose each other with the radiation sensitive member sandwiched therebetween. Additionally, the windows on the third and second panels are aligned and oppose each other with the radiation member sandwiched therebetween. Preferably, identity indicia is provided on at least the third panel to provide required information.

The present invention also envisions a method of producing a dosimeter device by providing a flat member defining at least two panels separated by at least one fold line, and providing a radiation sensitive member on at least one of the panels. In addition, the required attenuators are provided on the panel members such that upon folding, the radiation sensitive member becomes sandwiched between the two panels with the attenuator properly positioned and aligned vis-a-vis the radiation sensitive member.

A preferred method envisioned by the present invention is a method of producing a dosimeter device by unrolling a first roll or paper stock, placing the necessary attenuators on the unrolled paper, a first attenuator and a third attenuator being formed of a first material, a second attenuator and a fourth attenuator being formed of a second material, placing a radiation sensitive material on the unrolled paper, and rolling the unrolled paper into a roll. Then, the roll of paper is unrolled and indicia is printed thereon. Two fold lines are scored onto the unrolled paper to define three panels. The first panel has the first and third attenuators thereon, the second panel has the second and fourth attenuators thereon, and the third panel has the radiation sensitive member thereon. The unrolled paper is folded along the two fold lines wherein the third panel becomes sandwiched between the first panel and the second panel. The folded paper is then surrounded with lamination film, and is cut to separate a dosimeter device therefrom. While the drawings illustrate a hexagonal shaped dosimeter, the shape is arbitrary and may be circular, rectangular, etc. The second and fourth attenuators may be applied as a single layer or strip that bridges the fold line, such that upon folding, the strip or layer provides second and fourth attenuator portions (FIG. 6).

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 1:
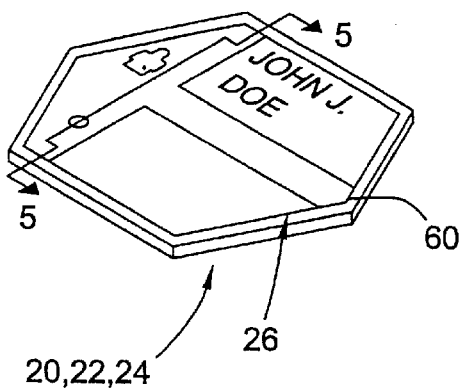
FIG. 1 is a top view of a folded dosimeter badge in accordance with the present invention.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 6:
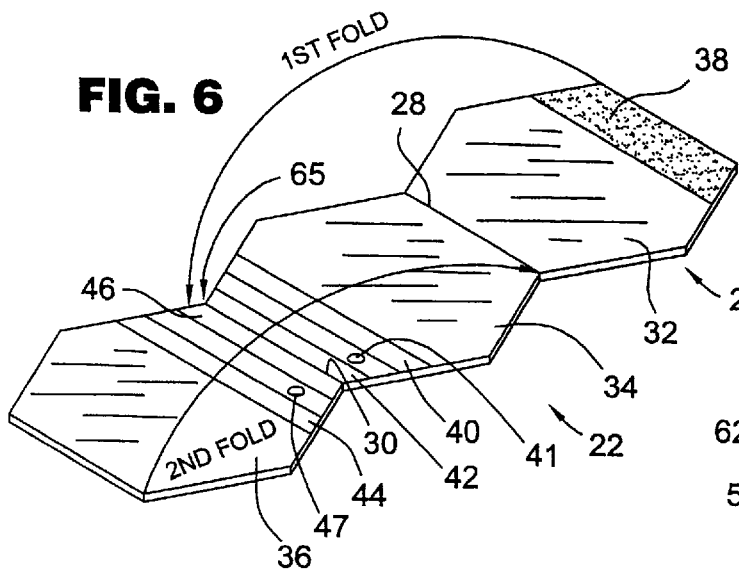
FIG. 6 is a top view of an alternative embodiment dosimeter badge, shown unfolded, bowing folding lines for folding same.
Figure 7:
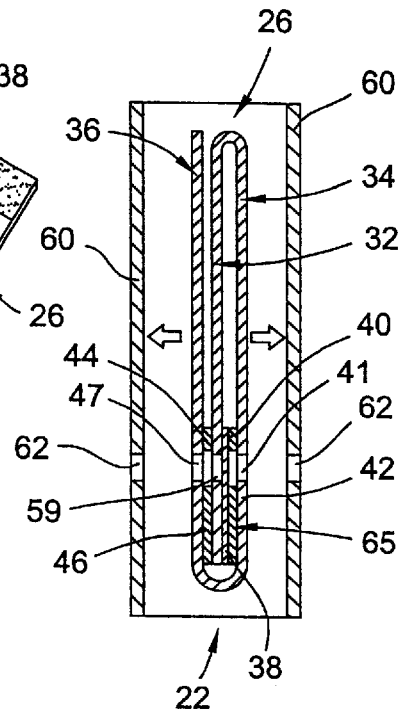
FIG. 7 is a cross-sectional view of the alternative embodiment dosimeter badge of FIG. 6, much like the view of FIG. 5, after the badge and has been folded, and after the badge has been surrounded by a protective attenuator.
Figure 8:
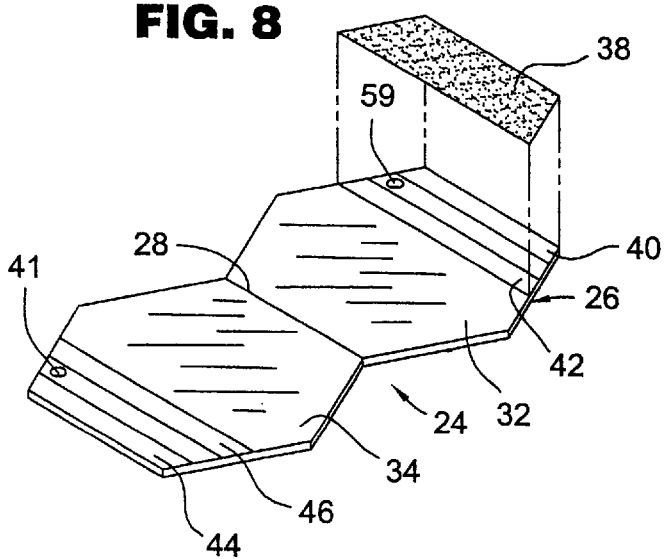
FIG. 8 is yet another embodiment dosimeter badge, employing a bi-fold design as opposed to the tri-fold arrangement of FIGS. 1–7, shown unfolded, and also showing a radiation sensitive member exploded away therefrom prior to application over attenuator strips.
Figure 9:
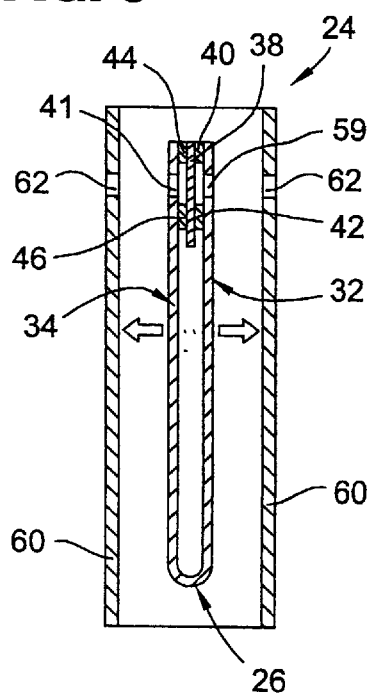
FIG. 9 is a cross-sectional view of the dosimeter badge of FIG. 8, much like the views of FIGS. 5 and 7, after the badge and has been folded, and after the badge has been surrounded by a protective attenuator.

Shown in FIGS. 1–9, 12 and 13 are three dosimeter badges 20, 22 and 24 in accordance with the present invention. FIGS. 2A, 2B and 3–5 show a first dosimeter badge 20, FIGS. 6, 7, 12, and 13 show a second dosimeter badge 22, and FIGS. 8 and 9 show a third dosimeter badge 24. FIG. 1 is generic to all three dosimeter badges 20, 22 and 24. To simplify the description thereof, the first dosimeter badge 20 will first be described, and then the other dosimeter badges 22 and 24 will be compared thereto.

Figure 2A:
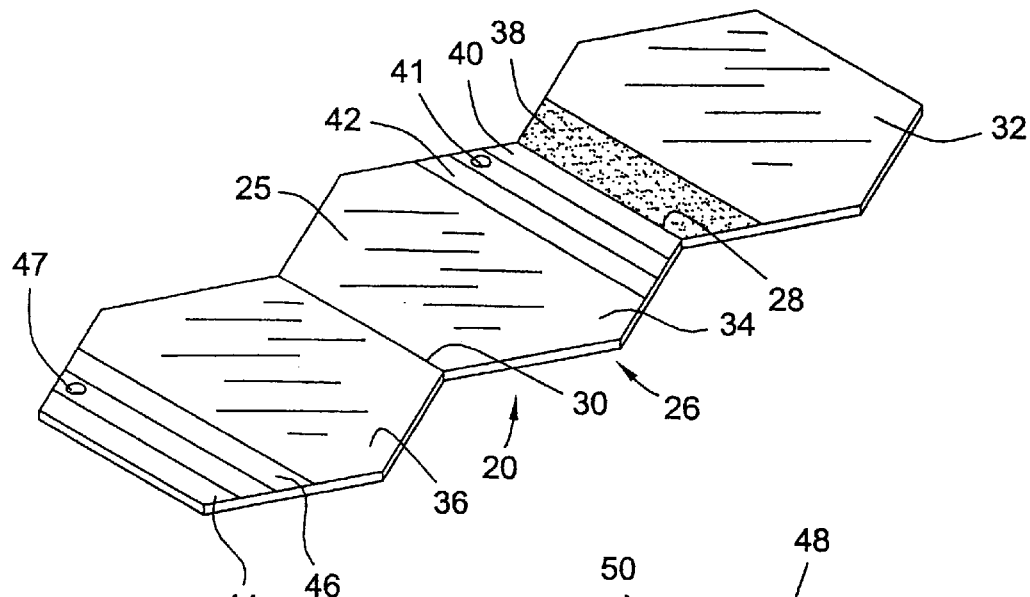
FIG. 2A is a top view of the dosimeter badge of FIG. 1 showing the dosimeter badge unfolded.
Figure 2B:
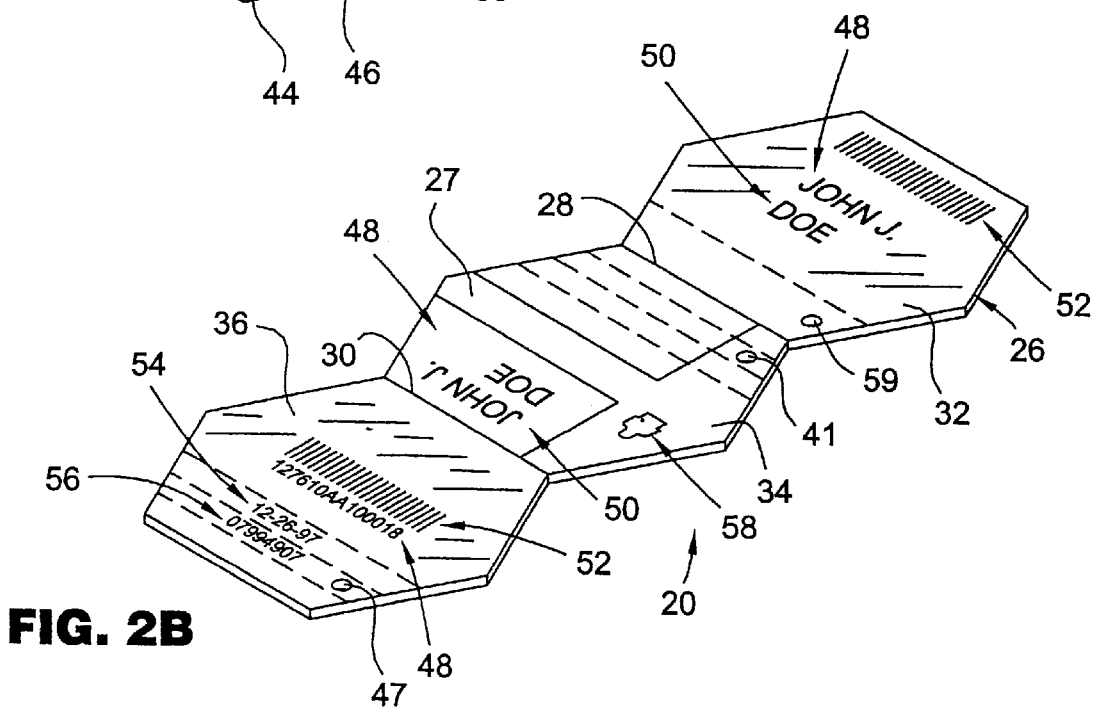
FIG. 2B is a view of the flip-side of the unfolded dosimeter badge of FIG. 2A.
Figure 3:
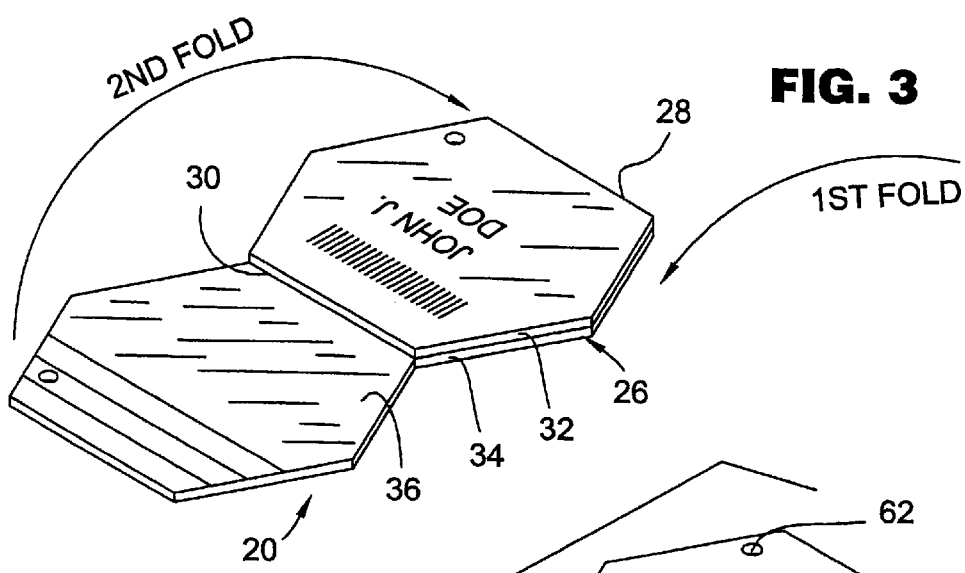
FIG. 3 is a view of the unfolded dosimeter badge of FIG. 2A, showing one panel folded onto another, and showing the folding over of yet another panel.

In accordance with the present invention, the first dosimeter badge 20, as shown in FIGS. 2A, 2B and 3, is formed of a flat member 26, such as paper stock, having a first side 25, and a second, opposite side 27, and is foldable along two fold lines 28 and 30. As shown, the fold lines 28 and 30 separate the flat member 26 into, essentially, three panels 32, 34 and 36. The first fold line 28 divides the first panel 32 from the second panel 34, and the second fold line 30 divides the second panel 34 from the third panel 36.

As shown in FIG. 2A, on the first side 25 of the flat member 26, on the first panel 32, is a radiation sensitive member 38 formed of, for example, a label or a slurry. While it is preferred that the radiation sensitive member 38 be comprised of aluminum oxide (sapphire) powder dispersed in a binder material and that the radiation sensitive member 38 be later analyzed using OSL dosimetry technology, it should be recognized that the radiation sensitive member 38 may be comprised of essentially any material which is sensitive to radiation in a manner by which information can be determined by analyzing the radiation sensitive member 38 using any dosimetry method, such as TLD, OSL or COSL. To this end, the radiation sensitive member 38 may comprise one or more crystals mounted to a substrate. Alternatively, the radiation sensitive member 38 may be radiological film. One having ordinary skill in the art would recognize that the radiation sensitive member 38 need not be provided on the flat member 26 in the specific location shown in FIG. 2A, so long as the location of the radiation sensitive member 38 is consistent with the objectives of the present invention, namely, obtaining information regarding exposure of the badge 20 to radiation. Further, it is not imperative that the radiation sensitive member 38 be provided in the specific shape depicted.

As shown, also on the first side 25 of the flat member 26, on the second panel 34 is a first attenuator 40, a second attenuator 42 spaced apart from the first attenuator 40 and a window or opening 41 on the second panel 34. Each of the attenuators, 40 and 42, may be comprised of essentially any material which provides desirable radiation filtering qualities. For example, each of the attenuators 40,42 may consist of a metal foil or a plastic material with a metal oxide imbedded therein. Alternatively, the attenuators 40,42 may be some type of ink or paste with one or more metals disposed within the matrix thereof. Regardless, preferably the first attenuator 40 and the second attenuator 42 provide distinctive radiation filtering qualities so that the distinction provides a "shaping" of radiation absorbed by the radiation sensitive member 38 when the badge 20 is exposed thereto. For example, the first attenuator 40/second attenuator 42 may be copper/aluminum, aluminum/lead, or titanium/antimony.

Much like the second panel 34, the third panel 36 has preferably two attenuators 44 and 46 thereon, and a window or opening 47 formed therein. Preferably, the third attenuator 44 has radiation filtering properties similar to that of the first attenuator 40 on the first panel 32. Similarly, preferably the fourth attenuator 46 has radiation filtering properties similar to that of the second attenuator 42 on the first panel 32. To this end, the first attenuator 40 is preferably comprised of the same material as the third attenuator 42, and the second attenuator 42 is preferably comprised of the same material as the fourth attenuator 46.

One having ordinary skill in the art would recognize that the attenuators 40, 42, 44 and 46 need not be shaped as is depicted in the Figures, and need not be located in the specific location shown, so long as the shape and location are consistent with the objectives of providing the attenuators in accordance with the present invention.

The second side 27 of the flat member 26 is shown in FIG. 2B. As shown, preferably identifying indicia 48 is provided thereon. For example, name-identifying indicia 50 may be provided thereon, such as on the first and second panels, 32 and 34, and bar code indicia 52 may be provided thereon, such as on the first and third panels, 32 and 36. Other indicia 48 may also be provided thereon, such as date-identifying indicia 54 and serial number indicia 56 on the third panel 36. Badge-placement indicia 58 may also be provided thereon, such as an icon of a portion of a human body with a dot, or some other indicia, identifying the location on which to wear the badge 20. This type of indicia is disclosed in U.S. Provisional Application entitled "Dosimeter Device Including Body Locator Indicia", Ser. No. 60/051,028, filed on Jun. 27, 1997, and the entire disclosure of that Provisional Application is hereby incorporated herein by reference. Of course, other 2D symbologies may be provided on the flat member 26 such as indicia to indicate during which particular time period the badge should be worn, and this is also extensively disclosed in the above-mentioned Provisional Application.

As shown in FIG. 2B, a window or opening 59 can also be provided on the first panel 32, adjacent the radiation sensitive member 38.

Figure 4:
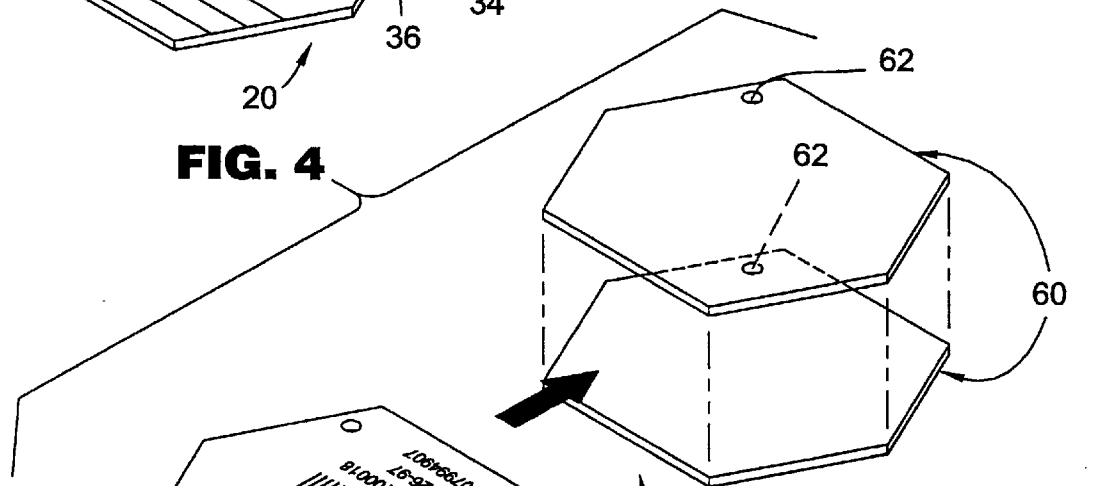
FIG. 4 is a view of the dosimeter badge of FIG. 3 after the badge is folded, showing the folded badge being surrounded by a protective attenuator.

As mentioned, the first panel 32 and the second panel 34 are separated by the first fold line 28 on the flat member 26, and the second and third panels, 34 and 36, are separated by the second fold line 30 on the flat member 26. As shown in FIG. 3, the flat member 26 is foldable along the fold lines 28 and 30 such that the first panel 32 can be folded onto the second panel 34, and the second panel 34 folded onto the third panel 36. After so folding the flat member 26, the flat member looks as shown in FIG. 4. As shown, the folded flat member 26 may then be encased or laminated in a surrounding protective cover or additional attenuator 60, such as plastic. Preferably, the protective attenuator 60 protects the folded flat member 26 and provides radiation filtering qualities which are distinct from those of the attenuators 40, 42, 44 and 46 provided on the flat member 26 such that the distinction provides further "shaping" of the information to be gained from subsequently analyzing the radiation sensitive member 38 after exposure to radiation. As shown, preferably the protective attenuator 60 has windows 62 formed therein which aligns with the windows 41, 47 and 59 in the flat member 26 when the flat member 26 is folded. After the flat member 26 has been folded and surrounded by the protective attenuator 60, the badge 20 looks as shown in FIG. 1.

Figure 5:
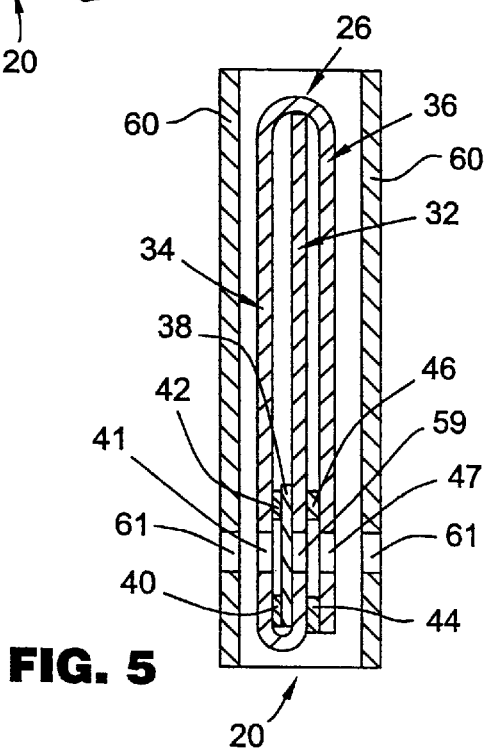
FIG. 5 is a cross-sectional view of the dosimeter badge of FIG. 1, taken along line 5—5 of FIG. 1 and of a generally schematic nature in that the layers have been separated to facilitate viewing and understanding.

FIG. 5 is a cross-sectional view of the badge shown in FIG. 1, taken along line 5—5 of FIG. 1. FIG. 5 is not shown to scale, and is enlarged to show detail and to facilitate description thereof. In addition, the spacing between the various layers has been exaggerated. In practice the various layers, including the plastic covers or layers 60 would be tightly spaced, or in close overlying juxtaposition. For example, the protective attenuator 60 is shown spaced relatively far apart from the folded flat member 26 for clarity. As shown in FIG. 5, when the flat member 26 is folded, preferably the first and third attenuators, 40 and 44, become aligned with each other with the radiation sensitive member 38 essentially sandwiched therebetween. Likewise, preferably the second and fourth attenuators, 42 and 46, become aligned with each other with the radiation sensitive member 38 essentially sandwiched therebetween. Additionally, preferably the windows 41, 47 and 59 on the panels 34, 36 and 32, respectively, also become aligned with each other, and also become aligned with windows 62 on the protective attenuator 60 with the radiation sensitive member 38 essentially sandwiched therebetween. In this manner, a plurality of filters are provided for filtering radiation as the radiation flows through the badge 20. Specifically, the first and third attenuators 40 and 44 provide a first filter for filtering radiation before the radiation contacts the radiation sensitive member 38, and second and fourth attenuators 42 and 46 provide a second filter for filtering radiation before the radiation contacts the radiation sensitive member 38. Additionally, the protective attenuator 60 provides a third filter, and the windows 41, 47, 59 and 62 provide a fourth "filter", essentially a non-filter. As a result, the information to be acquired by analyzing the radiation sensitive member 38 after being exposed to radioactivity is "shaped". As a result, more reliable data can be achieved from the analysis.

The badge 20 described above is streamlined, being both light and flat. Additionally, the badge can be utilized with any of the existing dosimetry methods and radiation sensitive devices as discussed above. Furthermore, the badge 20 is an integrated device, and provides that the radiation sensitive member 38 can be stored along with associated indicia 48 which is applied to the reverse side of the panel having the radiation sensitive member 38 thereon, such that the identifying information never becomes disassociated from the radiation sensitive member 38. Therefore, any risk of error is reduced considerably.

Shown in FIGS. 6 and 7 is an alternative badge design 22 in accordance with the present invention. The badge 22 shown in FIGS. 6 and 7 is similar to the badge 20 shown in FIGS. 2–5; therefore, like reference numerals are used to identify like parts and description relating thereto is omitted. As shown, badge 22 also includes three panels 32, 34 and 36 formed of a flat member 26 and bendable along fold lines 28 and 30.

Badge 22 also includes a radiation sensitive member 38 on the first panel 32, first and second attenuators 40 and 42 on the second panel 34, and third and fourth attenuators 44 and 46 on the third panel 36. However, as shown, the second and fourth attenuators 42 and 46 are now formed of, essentially, a single attenuator strip or layer 65 located on both the second and third panels, 34 and 36, respectively, spanning the fold line 30. Preferably, the attenuator 65 is bendable along the fold line 30 so that the third panel 36 can be bended onto the first panel 32 after the first panel 32 is folded onto the second panel 34. After the flat member 26 is so folded and is surrounded by protective attenuator 60, the resulting badge 22 looks as shown in FIG. 1 and FIG. 7, which is a cross-sectional view of FIG. 1 in accordance with this specific embodiment of the present invention. As shown, much like badge 20, badge 22 provides that the first and third attenuators 40 and 44 form a first filter for filtering radiation, the single attenuator 65, consisting of second and fourth attenuators 42 and 46, forms a second filter by way of its bend therein and by way of one portion of the attenuator 65 opposing another portion thereof with the radiation sensitive member 38 sandwiched therebetween. The protective attenuator 60 and the windows 41, 47, 59 and 62 provide a third and fourth filter, respectively, for filtering radiation before the radiation contacts the radiation sensitive member 38. As a result, "shaping" of the radiation is provided, as described previously hereinabove.

FIGS. 8 and 9 depict yet another badge 24 in accordance with the present invention. Badge 24 is much like badge 20, so like reference numerals are used to identify like parts, and description relating thereto is omitted. It should be noted that badge 24 is of a bi-fold construction as opposed to the tri-fold design of badges 20 and 22. As shown, a first panel 32 is separated from a second panel 34 by a fold line 28, much like as in badge 20. However, as shown in FIGS. 8 and 9, the radiation sensitive member 38 is provided or applied directly on the first panel 32, covering the first and second attenuators, 40 and 42, which are also on the first panel 32. The third and fourth attenuators, 44 and 46, are provided on the second panel 34 such that after the first panel 32 and second panel 34 are folded together along the fold line 28, and after the folded flat member 26 is surrounded by protective attenuator 60, the resulting badge 24 looks as shown in FIG. 1, and in FIG. 9 which is a cross-sectional view of FIG. 1 when structured in accordance with this specific embodiment of the present invention. Much like with the other, previously-described badges 20 and 22, badge 24 is provided with a plurality of filters for "shaping" the radiation as it contacts the radiation sensitive member 38. Different filters are provided by the first and third attenuators, 40 and 44, respectively; the second and fourth attenuators, 42 and 46, respectively; the protective attenuator 60; and the windows 41, 59 and 62.

A method of producing the badges will now be described. While the badge 22 of the type shown in FIGS. 6 and 7 is shown in the FIGURES depicting the method, one having ordinary skill in the art would recognize that the described method can also be used to produce the other badges 20 and 24 described hereinabove. The primary difference with respect to badge 22 vis-a-vis badge 20 is the location of the attenuators and the radiation sensitive element, as both are of a tri-fold design. Regarding badge 24 vis-a-vis badge 22, the badge 24 is a bi-fold design, however, the method can be adjusted to accommodate this clear difference.

Figure 10:
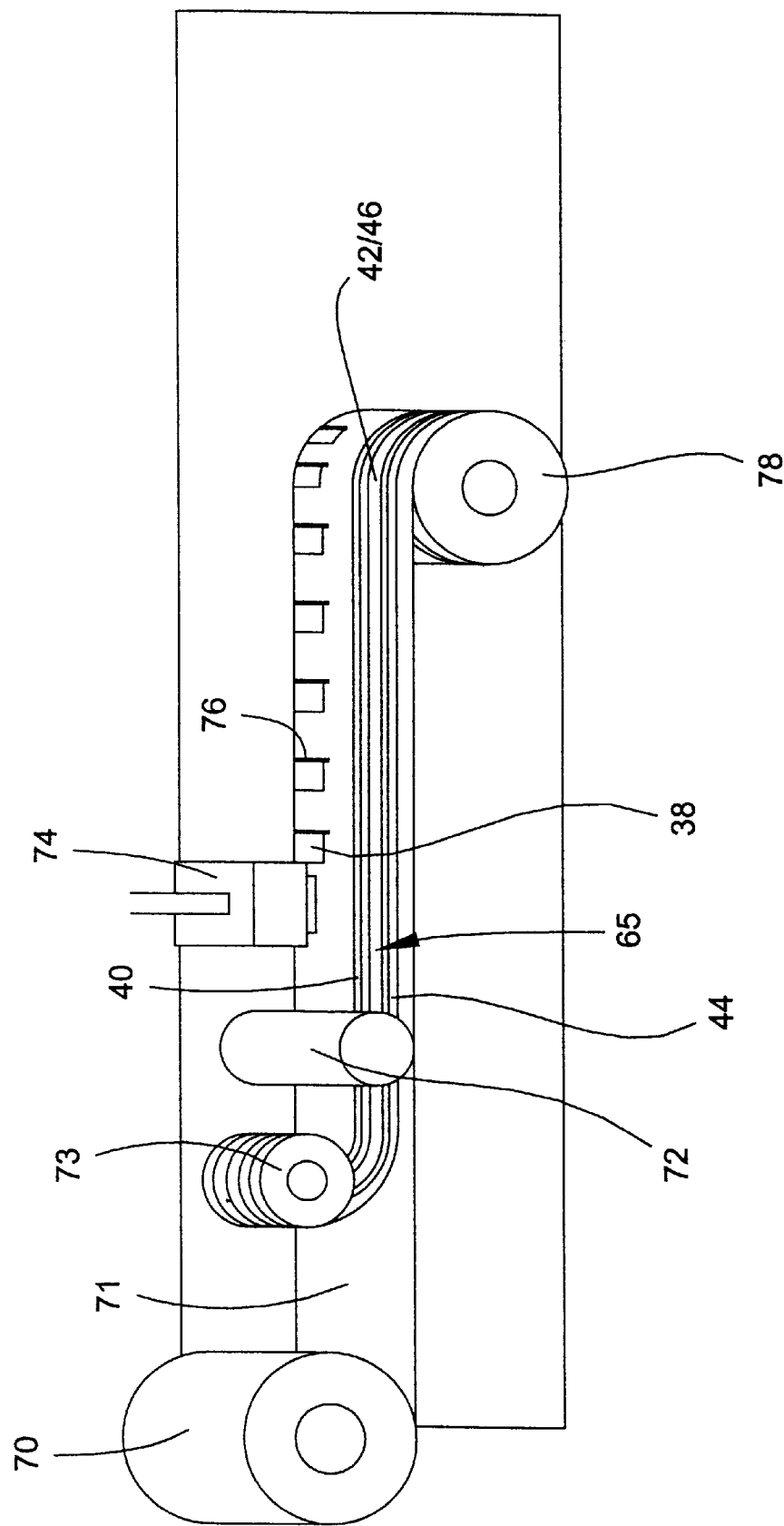
FIG. 10 is a schematic view showing steps performed during a first stage of a method of producing dosimeter badges in accordance with the FIG. 6 embodiment of the present invention.
Figure 13:
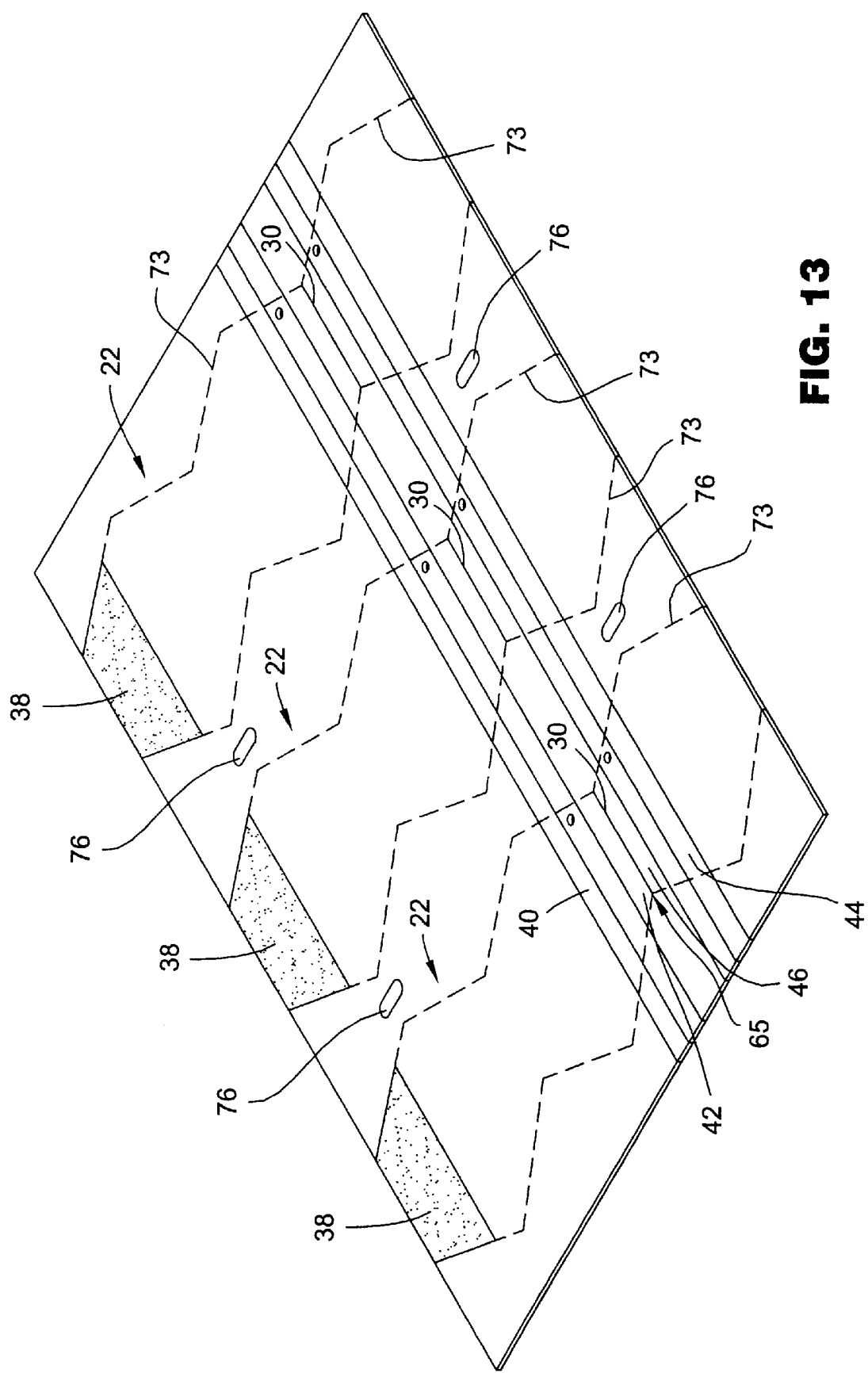
FIG. 13 is a view of a web of dosimeter badges provided during the first stage of the method of producing dosimeter badges in accordance with the present invention.

Shown in FIG. 10 is the first stage of the preferred method of the present invention. As shown, a roll 70 of flat stock material, such as paper, is initially provided, and the roll 70 is unwound to provide a surface 71 on which the attenuators 40, 42, 44 and 46 can be placed, regarding badge 22 construction. For example, to provide the attenuators 40, 42, 44 and 46, filtering foils may be placed on the surface 71 from a foil roll 73, or high density ink may be printed thereon. Alternatively, other structure which was identified above can be used, such as a paste. Should filtering foils be utilized to provide the attenuators 40, 42, 44 and 46 an inline foil laminator 72, as shown, would be used to laminate the foil thereon. Thereafter, the radiation sensitive member 38 is placed on the surface 71. Should badge 20 or 22 be produced, the radiation sensitive member 38 can be applied to the surface 71 before, or simultaneous with, placement of the attenuators 40, 42, 44 and 46. In contrast, should badge 24 be produced, the attenuators 40 and 42 will need to be placed thereon before the radiation sensitive member 38. Regardless, to provide the radiation sensitive member 38, a crystal slurry can be printed thereon by a crystal slurry printer 74, as shown, or the radiation sensitive member 38 may be applied as an adhesive label, with the radiation sensitive component affixed to a substrate which is in turn provided with an adhesive that permits the label to be applied to the flat strip. Alternatively, some other structure, such as those identified above, can be used in place of the crystal slurry. Preferably, an optical trigger 76 is printed on the surface 71. After these steps are performed, the surface 71 of the flat stock material looks as shown in FIG. 13. FIG. 13 also shows dotted outlines 73 to illustrate what will become the individual badges during subsequent steps in the present method. Ultimately, the flat stock can be re-rolled into a roll 78 and stored until it is time to print the identifying indicia 48 thereon, typically when an order is received.

Figure 11:
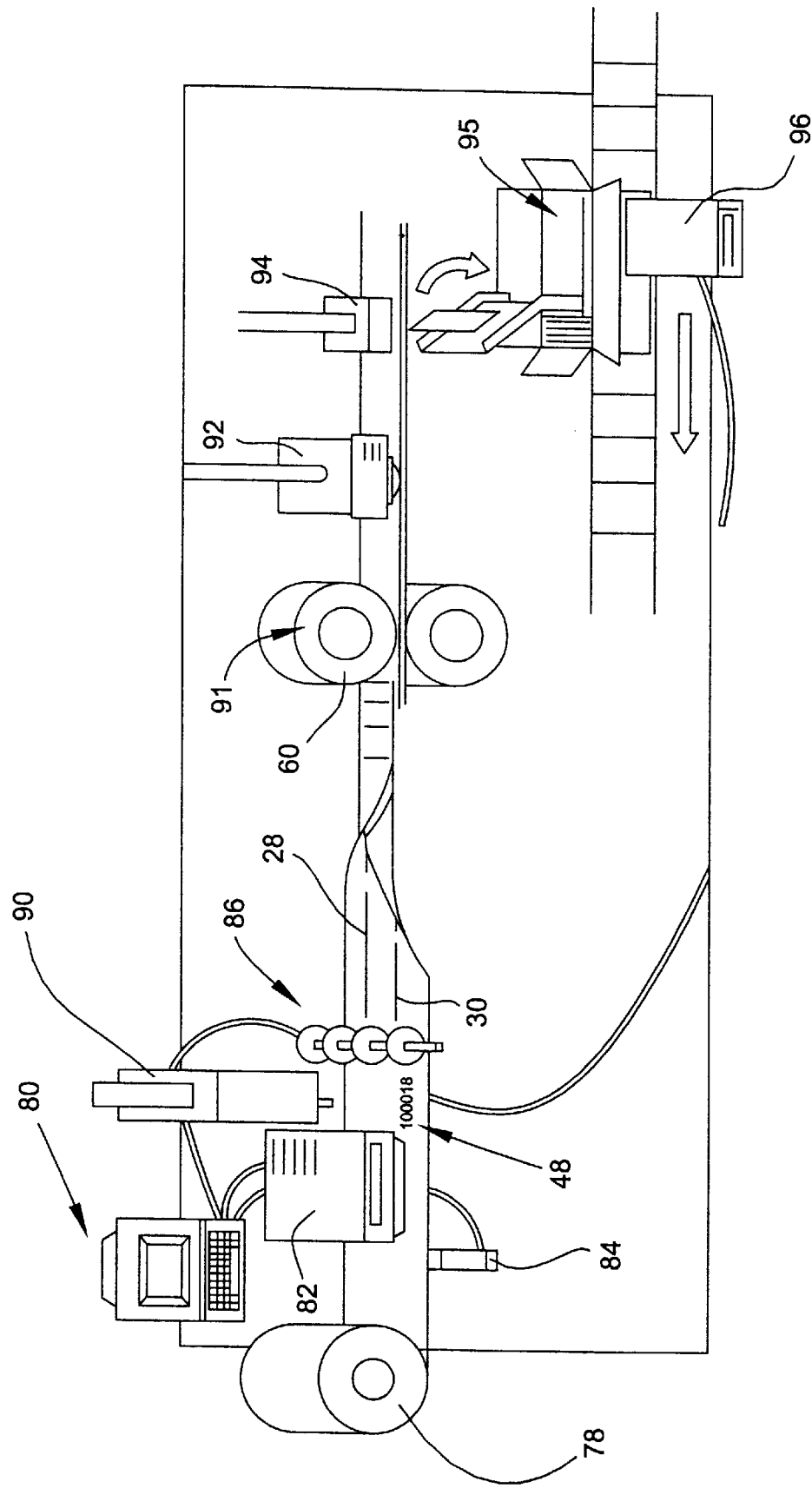
FIG. 11 is a schematic view showing steps performed during a second stage of a method of producing dosimeter badges in accordance with the present invention.

When it is time to print the indicia 48, the second stage of the method is performed, and this stage is shown in FIG. 11. As shown, a processor 80 is provided in communication with a printer 82. As the roll 78 is unrolled, optical reader 84 calibrates the printer 82 to the radiation sensitive member 38 deposited on the flat stock using the optical trigger 76 which had been printed on the stock. The indicia 48 is printed on the unrolled flat stock using the printer 82. The indicia 48 may include, but may not be limited to, the indicia shown in FIG. 2B and the indicia described hereinabove. For example, the indicia 48 may include, but is not limited to, user ID number, name, account number, a photo, logos, trademark symbols, personalized graphics, bar code, account name and logo, as well as an icon representing a portion of a human body and associated indicia to indicate on what part of the body the badge should be worn, and indicia representing the seasons of the year to indicate during what time period, or monitoring cycle, the badge should be worn. Of course, the indicia 48 may be provided by 2D symbologies as opposed to bar-coding or other alpha-numeric indicia. After printing on the flat stock a punch 90 can be used to provide the windows or openings 41, 47, 59. Alternatively, these openings may be formed in the first stage, prior to printing. Then flat stock can be scored to form the fold lines 28 and 30 using scoring blades 86. After scoring, the flat stock can be folded along the fold lines 28 and 30 to sandwich the radiation sensitive member 38 between attenuators 40, 42, 44 and 46. Then, the protective attenuator 60 can be applied to the flat stock from rolls 91 thereof, and a laminator 92 can be used to laminate the protective attenuator 60 thereto. Finally, a diecutter 94 can be used to die-cut individual badges from the flat stock (as outlined in FIG. 13) and seal the edges of the protected attenuator 60 then die cut. The individual badges then drop into an auto sealing carton 95, as shown in FIG. 11. A printer 96 may be provided for printing onto the carton 95 certain information such as order entry addresses, labels and bar codes. As shown, the printer 94 is preferably in communication with the processor 80.

Figure 12:
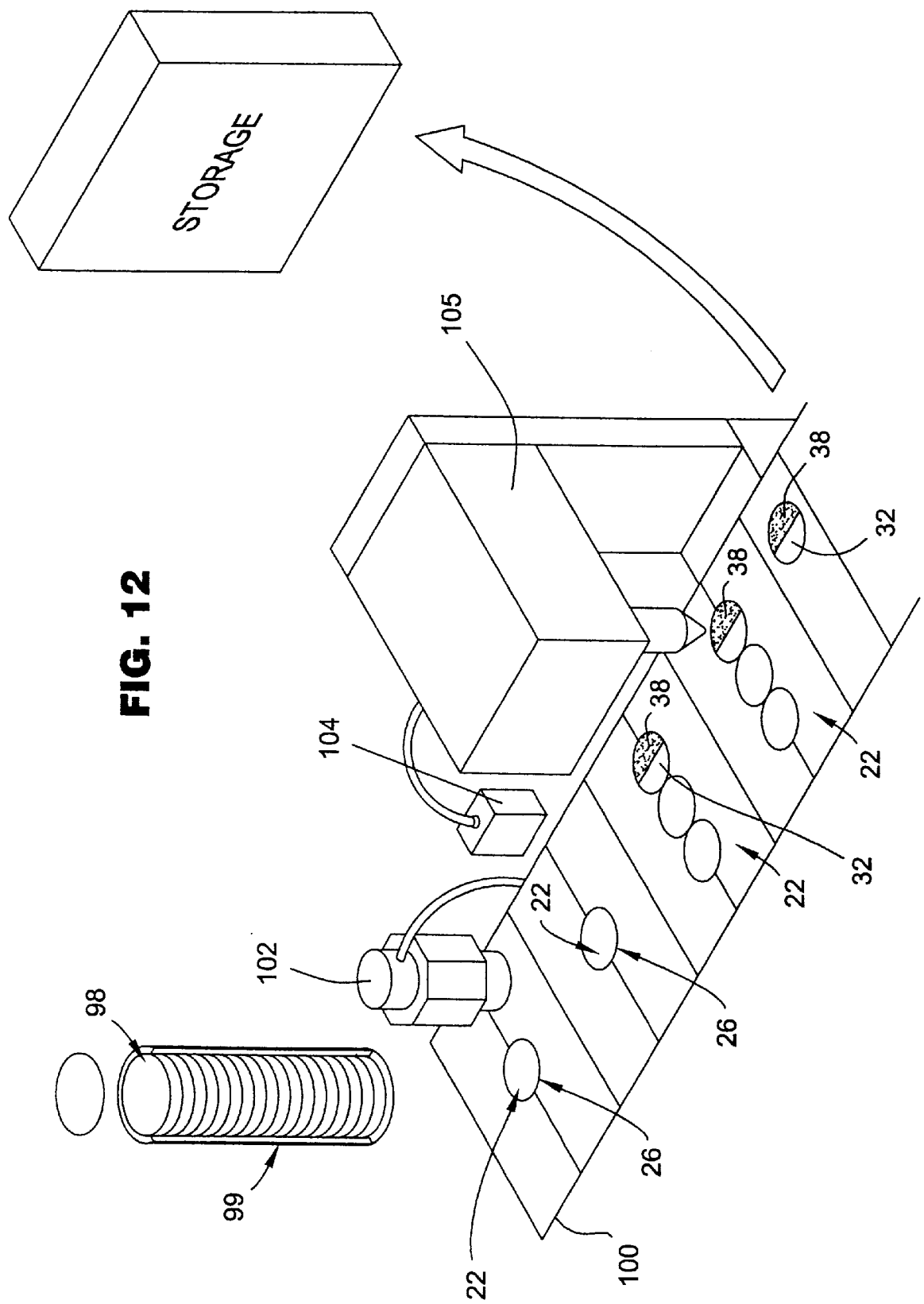
FIG. 12 is a schematic view showing unfolding of dosimeter badges, analyzing a radiation sensitive member provided thereon, and showing a portion of the dosimeter badge being stored.

As shown in FIG. 12, after the badges have been exposed to radiation during use or wear by an employee, they are returned from the plant, or at least have been collected from the corresponding employees, and the badges can be analyzed to determine exposure to radiation. Shown in FIG. 12 is a stack 98 of badges sitting in a feed tube 99 ready to be analyzed. As an individual badge 22 is deposited, or dropped, onto the conveyor 100 by the feed tube 99, the conveyor 100 carries the badge 22 to a punch 102 which relieves the lamination formed by the protective attenuator 60. Then, the badge 22 is carried to and positioned relative to an optical scanner 104 which scans the badge 22 for identification. Then, the badge 22 is unfolded to expose the radiation sensitive member 38 and transported to an analyzer 105, such as an optical analyzer should the OSL or COSL dosimetry method be used, which analyzes the extent of exposure of radiation and stores the information in the processor 80, or some other storage device, and correlates this information to the identifying indicia scanned at station 104. Finally, the badge 22 can be stored to maintain a permanent record of the exposure, or only the panel 32 having the radiation sensitive component 38 thereon can be stored with the remainder of the badge detached and discarded. It should be noted that the reverse side of panel 32 from that having the radiation sensitive component 38 thereon, will include all identifying indicia as necessary to provide a permanent record. This indicia remains with radiation sensitive member 38.

While the above-discussed phase of FIGS. 10 and 11 have been described as separate steps, it should be relayed that these phases could be practical or incorporated into a continuous line. Also, certain of the steps of the method could be altered. For example, in producing the bi-fold badge 24, the radiation sensitive element 38 would be applied over one or more attenuators. Further the folding operation would be less complex. As the disclosed method is essentially a continuous method, various printing techniques can be utilized to provide the essential components of the dosimeter, namely, the radiation sensitive element 38, the attenuators or filters 40, 42, 44 (FIG. 6), and the necessary identifying indicia 50, 52, etc. To the best of Applicant's knowledge, no such method has been used to produce dosimeter badges. By using such a method, dosimeter badges can be produced very quickly, several at a time, and the badge produced therefrom is extremely light and thin, unlike the bulky dosimeter badges of the prior art. Also, due to the use of a flat stock or substrate, and computer printing techniques, there is no limit to the amount of identifying indicia employed and no restrictions on the location thereof.

While preferred embodiments of the present invention are shown and described, it is envisioned that those skilled in the art may devise various modifications and equivalents without departing from the spirit and scope of the invention. As such, the invention is not intended to be limited by the foregoing disclosure.

What is claimed is:

1. A dosimeter device comprising: a flat member bendable along at least one line to divide said flat member into at least two panels; and a radiation sensitive member affixed to at least one of said panels and sandwiched between said panels when the flat member is folded, wherein said panel which has said radiation sensitive member affixed thereto has identifying indicia thereon.

2. A dosimeter device as recited in claim 1, wherein said flat member is separated into three panels along two fold lines.

3. A dosimeter device as recited in claim 1, wherein said flat member is separated into two panels along one fold line.

4. A dosimeter device as recited in claim 1, wherein at least one panel has a window formed thereon.

5. A dosimeter device as recited in claim 1, further comprising identity indicia on said flat member to provide desired identity information.

6. A dosimeter device as recited in claim 1, wherein a plurality of said panels have a window formed thereon which become aligned and oppose each other with the radiation sensitive member sandwiched therebetween when said flat member is folded along said at least one line.

7. A dosimeter device as recited in claim 1, further comprising a protective attenuator surrounding said flat member.

8. A dosimeter device as recited in claim 1, wherein a first panel includes said radiation sensitive member and a second panel has at least two attenuators thereon.

9. A dosimeter device as recited in claim 8, further comprising a first attenuator and a second attenuator on said second panel, said first attenuator formed of a first material and said second attenuator formed of a second material.

10. A dosimeter device as recited in claim 9, further comprising a third attenuator and a fourth attenuator on a third panel, wherein said third attenuator is formed of the same material as said first attenuator which is on said second panel, and wherein said fourth attenuator is formed of the same material as said second attenuator which is on said second panel.

11. A dosimeter device as recited in claim 10, wherein a third panel has a window formed thereon.

12. A dosimeter device as recited in claim 10, wherein when said flat member is folded along said fold lines, said first panel becomes sandwiched between said second and third panels, and said first and third attenuators are aligned and oppose each other with said radiation sensitive member sandwiched therebetween.

13. A dosimeter device as recited in claim 12, wherein said second and fourth attenuators are aligned and oppose each other with said radiation sensitive member sandwiched therebetween.

14. A dosimeter device as recited in claim 10, further comprising identity indicia on said third panel to provide desired identity information.

15. A dosimeter device as recited in claim 8, wherein said second panel has a window formed thereon.

16. A dosimeter device as recited in claim 1, wherein said panel which has said radiation sensitive member affixed thereto has said radiation sensitive member affixed to one side and has said identifying indicia on an opposite side, said identifying indicia being on an external surface of said dosimeter device.

17. A method of producing a dosimeter device comprising: providing a fat member defining at least two panels separated by at least one fold line; providing a radiation sensitive member affixed to at least one of said panels; providing at least one attenuator on at least two of said panels; folding said panels such that said radiation sensitive member becomes sandwiched between said panels and said attentuators, further comprising applying identifying indicia to the panel on which said radiation sensitive member is affixed thereto.

18. A method as recited in claim 17, further comprising unrolling a first roll of paper stock; placing a first attenuator, a second attenuator, a third attenuator and a fourth attenuator on said unrolled paper stock, said first attenuator and said third attenuator being formed of a first material, said second attenuator and said fourth attenuator being formed of a second material; placing said radiation sensitive material on the unrolled paper; and rolling the unrolled paper with said attenuators and said radiation sensitive material thereon.

19. A method as recited in claim 18, further comprising unrolling said paper with said attenuators and said radiation sensitive material thereon and printing indicia on said unrolled paper.

20. A method as recited in claim 18, further comprising unrolling said paper with said attenuators and said radiation sensitive material thereon and scoring two fold lines on said unrolled paper to define three panels.

21. A method as recited in claim 20, wherein a first panel has said first and third attenuators thereon, a second panel has said second and fourth attenuators thereon, and a third panel has said radiation sensitive member thereon.

22. A method as recited in claim 21, further comprising folding said unrolled paper with said attenuators and said radiation sensitive material thereon along said two fold lines, wherein the third panel becomes sandwiched between the first panel and the second panel.

23. A method as recited in claim 22, further comprising surrounding said folded paper with a protective attenuator, and cutting said folded paper surrounded by protective attenuator to separate a dosimeter device therefrom.

24. A method as recited in claim 18, further comprising unrolling said paper with said attenuators and said radiation sensitive material thereon and scoring a fold line on said unrolled paper to define two panels.

25. A method as recited in claim 24, wherein a first panel has said first attenuator, said third attenuator and said radiation sensitive member thereon, and said second panel has said second and fourth attenuators thereon.

26. A method as recited in claim 25, further comprising folding said unrolled paper with said attenuators and said radiation sensitive material thereon along said fold line, wherein said radiation sensitive member becomes sandwiched between said first and second panels.

27. A method as recited in claim 26, further comprising surrounding said folded paper with a protective attenuator, and cutting said folded paper surrounded by protective attenuator to separate a dosimeter device therefrom.

28. A method as recited in claim 17, further comprising applying identifying indicia to the panel on which said radiation sensitive member is affixed thereto, wherein said panel which has said radiation sensitive member affixed thereto has said radiation sensitive member affixed to one side and has said identifying indicia on an opposite side, said identifying indicia being on an external surface of said dosimeter device.

* * * * *

UNITED STATES PATENT AND TRADEMARK OFFICE
CERTIFICATE OF CORRECTION

PATENT NO.   : 6,198,108 B1
DATED        : March 6, 2001
INVENTOR(S)  : David Schweitzer, Mathew Bantly and Robert Wheeler It is certified that error appears in the above-identified patent and that said Letters Patent is hereby corrected as shown below:

<u>Column 6,</u>
Line 9, " bowing" should be -- but showing --

<u>Column 13,</u>
Line 13, "fat" should be -- flat --

Signed and Sealed this

Thirtieth Day of October, 2001

Attest:

NICHOLAS P. GODICI
Acting Director of the United States Patent and Trademark Office Attesting Officer